…

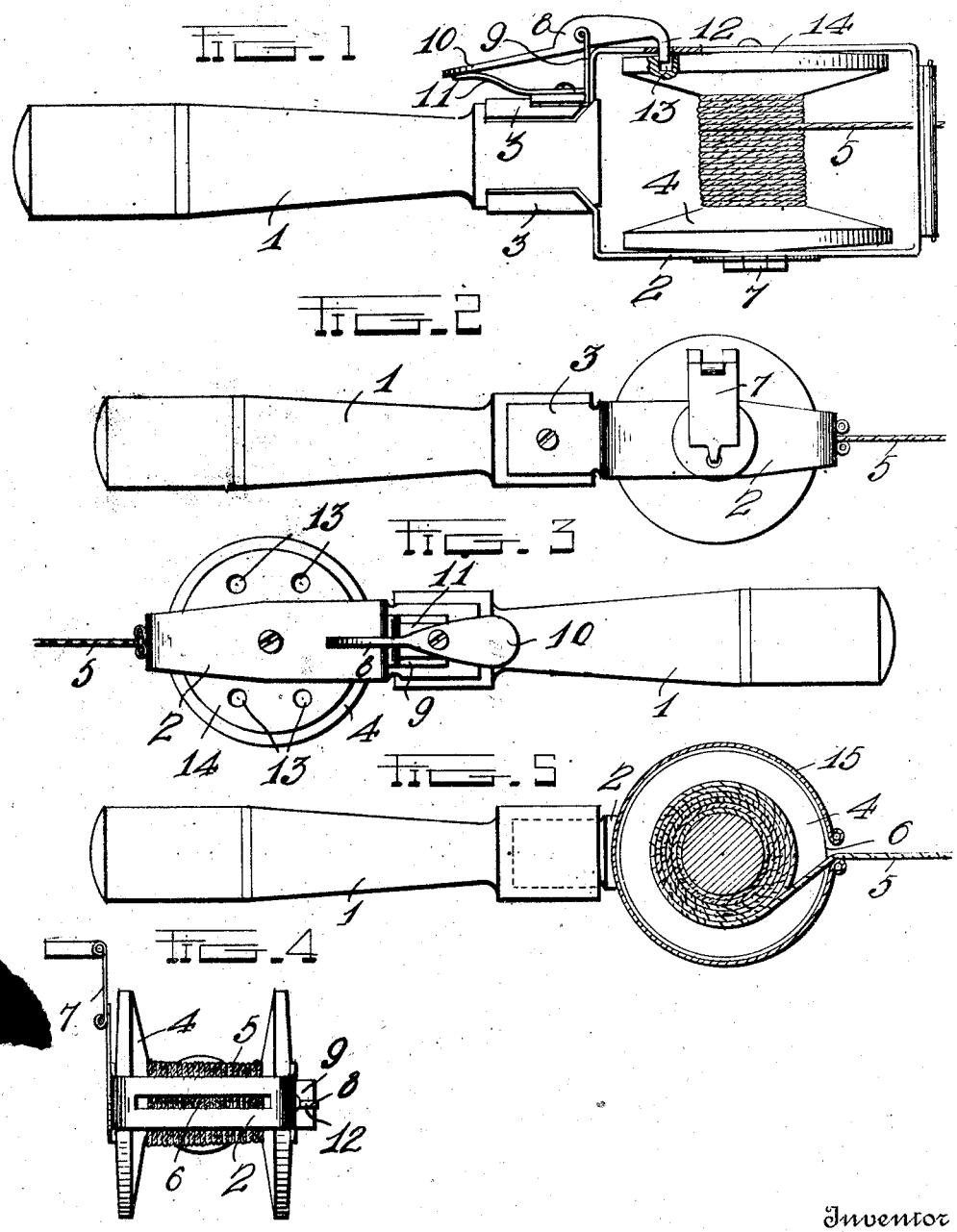

UNITED STATES PATENT OFFICE.

WILLIAM H. FUERST, OF KEWANEE, ILLINOIS.

CHALK-LINE REEL.

999,641.   Specification of Letters Patent.   Patented Aug. 1, 1911.

Application filed July 11, 1910. Serial No. 571,433.

*To all whom it may concern:*

Be it known that I, WILLIAM H. FUERST, a citizen of the United States, residing at Kewanee, in the county of Henry and State of Illinois, have invented certain new and useful Improvements in Chalk-Line Reels; and I do declare the following to be a full, clear, and exact description of the invention, such as will enable others skilled in the art to which it appertains to make and use the same.

This invention relates to improvements in chalk line reels.

One object of the invention is to provide a chalk line reel having an improved construction of spool holding mechanism whereby the spool may be fastened after the desired length of line has been unwound therefrom.

Another object is to provide a reel having a jointed spool operating handle whereby the latter may be folded back to an out of the way position when not in use.

With these and other objects in view, the invention consists of certain novel features of construction, combination and arrangement of parts as will be more fully described and particularly pointed out in the appended claim.

In the accompanying drawings: Figure 1 is a plan view of a reel constructed in accordance with the invention; Fig. 2 is a side view of one side of the reel; Fig. 3 is a similar view of the opposite side; Fig. 4 is an end view of the same; Fig. 5 is a longitudinal sectional view of a modified form of reel showing the same provided with a protecting cover.

Referring more particularly to the drawings 1 denotes the handle of my improved reel, said handle being of any desired size and shape. To the outer end of the handle is secured the inner ends of a bearing frame 2 which is preferably constructed from a flat strip of galvanized metal which is bent into rectangular form to provide the frame and has its inner ends bent outwardly at right angles to the inner end of the frame to form attaching lugs 3 which in the present instance are curved or rounded transversely to fit the cylindrical outer end of the handle as shown. The lugs 3 are secured to the handle by screws or other suitable fastenings whereby the frame is rigidly supported.

Revolubly mounted in the opposite sides of the frame 2 is a line winding spool 4 on which is adapted to be wound a chalk or other form of line 5 the free end of which is passed through a guide slot 6 formed in the outer end of the frame 2 as clearly shown in Fig. 2 of the drawings. To the shaft or journal of the spool 4 at one side of the frame 2 is secured a jointed crank handle 7 which when not in use is adapted to be folded back to an inoperative position as clearly shown in the drawing.

In order to hold the spool against rotation after the desired length of line has been unwound therefrom I provide a suitable spool locking mechanism which is here shown and preferably consists of a pawl 8 pivotally mounted in a suitable bearing bracket 9 secured to one side of the frame 2 and handle 1 as shown. On the inner end of the pawl 8 is formed a flat thumb piece 10 which is adapted to be engaged by a flat metal spring 11 secured to the frame or handle whereby the opposite end of the pawl will be forced inwardly. On the outer end of the pawl is formed a stop finger 12 which is adapted to project through a hole 14' in the adjacent side of the frame and to engage one of an annular series of locking apertures 13 formed in a circular wear plate 14 secured to the adjacent end of the spool as shown. When the finger 12 of the pawl is thus engaged with the hole 14' and one of the apertures 13 the spool will be securely locked or held against rotary movement thereby preventing any further unreeling of the line therefrom. When it is desired to unwind or wind up the line the thumb piece 10 on the end of the pawl is depressed thereby rocking said pawl and disengaging the stop pin 12 from the apertures in the reel plate 14 and end of the spool thus permitting the latter to revolve in the desired direction.

While the reel has been designated as a chalk line reel it is obvious that the same may be employed for winding and holding any form of line and it is intended to construct the device in a number of different sizes and to employ the same for different purposes. In one form the device may be employed as a clothes line reel and in connection with this form I preferably provide a protecting covering 15 which is arranged over the spool and secured to the frame as shown in the drawing.

The outer or free end of the line when in use may be fastened in any suitable manner said end of the line however being preferably secured by suitable fastening devices provided for the purpose and which will accompany the reel when prepared for sale and placed on the market.

Having thus described my invention what I claim is:

A reel of the character described comprising a frame with a handle secured thereto and having an opening at one side and at one end, a spool rotatably mounted in the sides of the frame and having a series of apertures therein which are adapted to register with the opening in the side of the frame, an angular bracket and a flat spring secured to the handle, said bracket having a bearing in its upper end, an operating handle pivoted to the bearing and having one end contacting with said spring, the other end of the handle having a right-angular finger which is adapted to be held in said apertures by said spring and released therefrom by pressure on the end of the handle which contacts with said spring.

In testimony whereof I have hereunto set my hand in presence of two subscribing witnesses.

WILLIAM H. FUERST.

Witnesses:
  ALBERT SCHNEIDER,
  HERMANN FREYER.